Jan. 12, 1926.
S. L. ROGERS
1,569,204
VELOCIPEDE
Filed Oct. 6, 1923
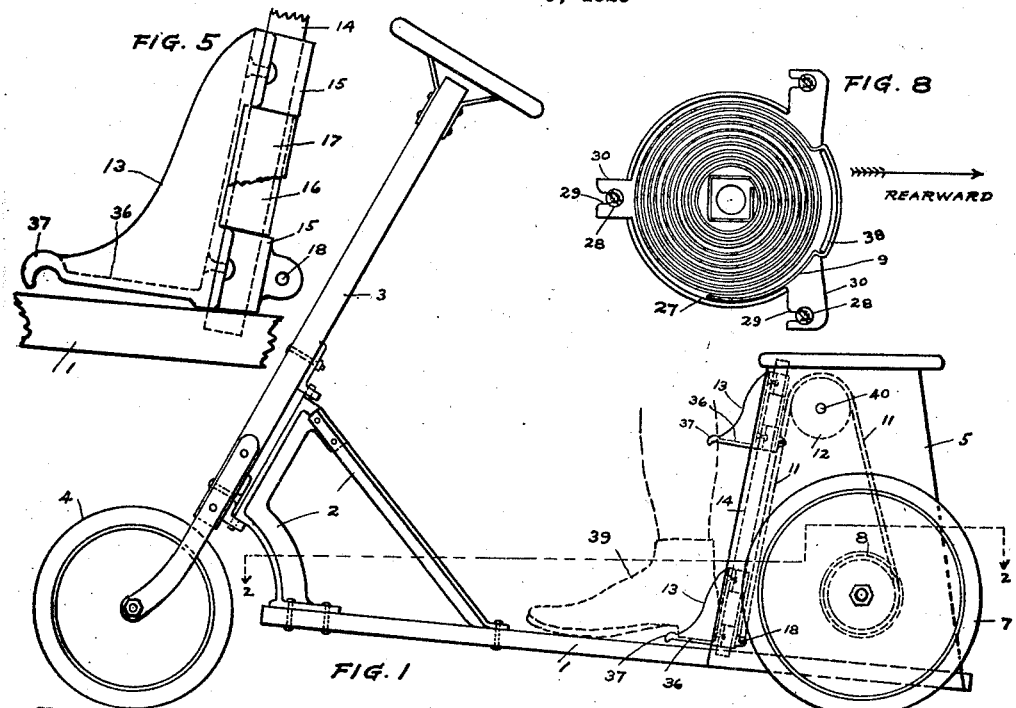
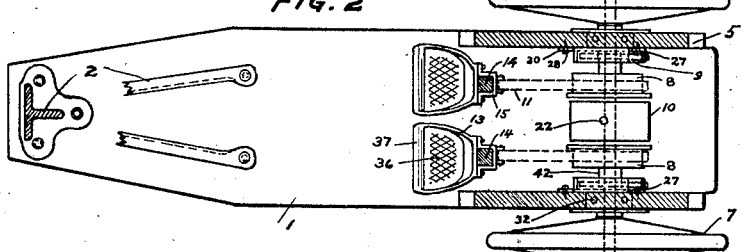
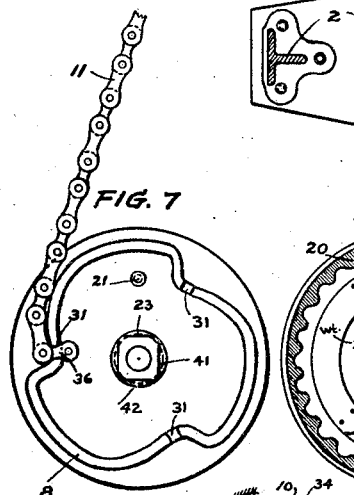
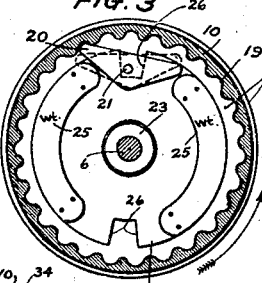
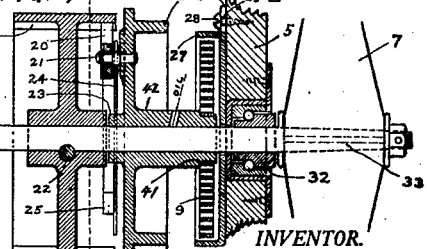
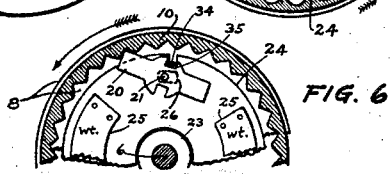
INVENTOR.
Samuel S. Rogers
BY Julien A. Brief
HIS ATTORNEY.

Patented Jan. 12, 1926.

1,569,204

UNITED STATES PATENT OFFICE.

SAMUEL L. ROGERS, OF SAN FRANCISCO, CALIFORNIA, ASSIGNOR TO JULIEN A. BRIED, OF OAKLAND, CALIFORNIA.

VELOCIPEDE.

Application filed October 6, 1923. Serial No. 666,978.

*To all whom it may concern:*

Be it known that I, SAMUEL L. ROGERS, a citizen of the United States, residing at San Francisco, in the county of San Francisco and State of California, have invented new and useful Improvements in a Velocipede, of which the following is a specification, and which is illustrated in the accompanying drawings.

My invention relates to velocipedes principally of the three wheel type which are propelled by a rider standing upright thereon, tho it may be used with velocipedes having any number of wheels.

The invention has for its principal objects such a vehicle of power and speed with a unique arrangement of the foot propelling devices, so as to dispense with the usual treadles and leave a clear low platform for standing upon with both feet, and also other improvements in the propelling arrangement which will be explained as the description unfolds.

My invention is illustrated in the drawings accompanying this application and in which Fig. 1 is a side view of my velocipede, Fig. 2 is a plan view along the line 2—2 of Figure 1 but with the steering post and front wheel omitted.

Fig. 3 is an enlarged detail of the ratchet drive taken along the line 3—3 of Figure 4, Fig. 4 being a similar size longitudinal sectional view of the ratchet drive taken centrally through the axis of the drive members. Fig. 5 is an enlarged detail of one of the heel receiving brackets by which the rider operates the vehicle.

Fig. 6 shows a modification of the ratchet pawl arrangement.

Fig. 7 is an enlarged side view of the pawl spool looking toward the center of the vehicle and shows the chain connection thereto.

Fig. 8 is an enlarged detail of the return spring connecting plate, which secures to the inner side of the vehicle, two being used.

In Figures 1 and 2 my vehicle will be seen to consist of a low board platform 1 upon which the rider stands. The platform is pivotally connected by suitable bracing 2 to a steering post 3 having a front wheel 4 at its lower end. The rear end of the platform has a body 5 built upon it, and which body supports a rear axle 6 with rear wheels 7 thereon.

The rear axle carries a pair of spring return ratchet pawl spools 8 actuated by coiled springs 9 secured at one end to the hub of the spool and reacting against the side of the vehicle through a stationary spring securing plate 27.

The pawl spools 8 each carry pawls to be later explained and which engage a central ratchet hub 10 secured to the shaft at 22.

Attached to these spools are chains 11 passing upwardly over idler rollers 12 carried on a transverse shaft 40. The chains extend over the idlers and are secured at the forward ends to special heel brackets 13. These brackets take the place of the treadles formerly used in this type of vehicle, but leave a clear platform, un-encumbered by treadles, for the rider to stand upon.

Ordinarily there are two of the heel brackets, (tho one only could be used if desired) placed side by side, and formed each to receive one of the heels of a rider. They may be long enough to embrace the whole heel, or just the rear portion, as desired.

The heel brackets are slidable up and down, each on a rod 14. This may be a round rod but is best of square section as shown to keep the brackets from too much twisting, and while I have shown but one rod to a bracket, of course any number may be used or in any position.

Normally the brackets are both at the top of the rods, being pulled up by the spring return pawl spools to which the other ends of the chains are fastened, but in Fig. 1 one bracket is shown depressed as though a rider's foot 39 were upon it.

Upon a rider pushing down either bracket the spools are independently operated, and through the pawl engaging the ratchet hub the vehicle is propelled. It will be apparent that the brackets and guides may be of various forms to carry out the invention, but the form shown is simple, cheap, and lends itself to easy manufacture. Fig. 5 shows an enlarged detail side view of a bracket on its guide, and it will be observed to have upper and lower bearings 15, between which is an oiling pad 16 surrounding the rod and held in place by a sheet metal cover 17, which latter is broken away at the bottom to reveal the pad. This construction insures proper lubrication of the rod for a long period of time. At 36 is indicated a heel supporting plate or grill, and at the edge 37 it is shaped into a transverse bar on which the heel can get a purchase to hold the foot in place during the rocking motion of the foot in operation, as the bar 37 being smooth permits the shoe to rock over it, having the same function as though the bar were a revolvable roller. A connection for the chain to the bracket is indicated at 18.

Returning now to the ratchet and pawls, Fig. 3 shows in enlarged section the peculiar construction. The ratchet hub 10 is seen to have rounding internal teeth 19 engaged by a pawl 20 pivoted at 21 to the pawl spool 8. The spool has a short hub 23, is supported by the axle 6 and is free to revolve thereon. Loosely supported, preferably on the hub, is a thin metal disk 24 having inertia weights 25—25 secured or formed thereon and which move against the pawl to throw it into or out of engagement with the ratchet hub, or rather the pawl spool carries the pawl against the weighted disk as the latter lags behind upon the sudden rotation of the spool, but passes a given point on the spool upon the latter's stoppage at the end of the stroke (due to its momentum) thus throwing the pawl out of engagement, and the weight again lags behind upon reversal of the spool thus keeping the pawl disengaged.

The vehicle will consequently run without any clicking of the ratchets and is free for backing up, and while I show rounded pawl and ratchet teeth, it is understood this is subject to modification also the precise form of engagement of the pawl with the inertia device is of no importance as many modifications are possible.

The rounded teeth and pawl wear best and the pawl will not fall out of engagement while under the pressure of the transmission effort. The arrow shows the direction of rotation of the pawl spool when driving the vehicle, the pawl being made double ended as shown simply to balance it and to make it reversible when worn.

To prevent the weight throwing the opposite end of the pawl into engagement upon reversing of the spool rotation, the disk 24 has an eccentric relation to the pawl, being extended to the free space back of the pawl and having a cut out notch 26 to strike the pawl pivot 21 and thus limit the disk's and thereby the pawl's movement in either direction. The weights 25 are balanced on the disk and the disk notched at opposite points to balance it and also to make it reversible for use with the pawl on the other spool, but the position of the weights is such as to limit the pawls engagement to one end only, the maximum opposite movement resulting in both ends being disengaged as denoted by the pawl dotted in released position.

In Figure 4 the longitudinal section of the ratchet drive, the explanation above given is clarified, the various parts being numbered as described, and the view further shows the return spool spring 9 in place with its inner coil over the square end 41 of the long hub 42 of the spool, and at 27 is shown a stationary washer plate or spring casing holding the outer end of the spring and secured to the side of the body 5 by screws 28 in slots 29 in ears 30 on the plate for holding it centralized.

Fig. 8 is an enlarged plan view of the spring plate described showing its form, and within it the spring 9 in position outwardly looped over and inwardly turned edge of the plate at 38. The slots 29 in the ears 30 permit the removal of the plate from the screws 28 upon pulling out the axle, or its reverse insertion.

Proper tension on the springs is secured by selecting hooking of the drive chain 11 in different slots in the pawl spool rim. Fig. 7 shows this clearly, the rim of the spool is seen to be made with three inward depressions with a slot 31 at the bottom of each, into which the last link of the chain may be slipped, as shown at 36.

Fig. 6 shows an optional arrangement of tripping the pawl by the inertia weight. The disk 24 is extended back of the pawl as before, but has a little tit 34 bent forward into a notch 35 formed in the pawl, so as to move the pawl upon relative movement of the spool and disk. In this arrangement the weights 25 are kept spaced from the pawl so as not to strike it, for as explained the tit engages the pawl, the functioning of the arrangement being the same as described for Figure 3. A slot 26 in the disk limits its movement, keeping the pawl with both ends disengaged at one end of the movement, as explained.

Returning to Fig. 4, at 32 is indicated one of the ball bearings for the rear axle, and at 33 is indicated the driving connection between one of the rear wheels 7 and the rear axle 6.

Having thus described my invention, it will be seen that my improved driving arrangement while being primarily useful with a vehicle as shown, might also be useful with vehicles showing considerable variance therefrom, therefore in the appended claims I have entered sub-combination claims to limit the use of the invention to me in any type of foot operated vehicle.

I claim:

1. In a velocipede, a front steering wheel, a rear driving road wheel, framing connecting the wheels including a platform adapted for a rider to stand upon, and a movable device at the rear of the platform connected through suitable power transmitting elements for driving the rear wheel and adapted for movement by the heel only of the rider to drive the rear wheel.

2. In a velocipede, a front steering wheel, a rear driving road wheel, framing connecting the wheels including a platform adapted for a rider to stand upon, a pair of movable devices at the rear of the platform connected through suitable power transmitting elements for driving the rear wheel and adapted for movement each by one heel only of the rider.

3. In a foot operated vehicle of the character described, a foot platform adapted for a rider to stand upon, driving mechanism for the vehicle including a foot receiving bracket slidable up and down above the platform on a guide arranged at one end of the platform and above the same.

4. In a foot operated vehicle of the character described, a foot platform adapted for a rider to stand upon, driving mechanism for the vehicle including a pair of heel receiving brackets, a pair of guides; one for each bracket; vertically arranged at one end of the platform and above the same upon which the brackets are slidable up and down.

5. In a vehicle of the class described, a foot operated bracket adapted to receive the heel of a rider, said bracket having upper and lower bearings, a guide rod passing through the bearings, and a lubricating pad on the bracket lying against the rod.

6. In a vehicle of the character described, a rear shaft, a road wheel on said shaft, a ratchet return spool on said shaft, a flexible device secured at one end to the spool, an idler over which said device extends, a guide, a bracket slidable up and down on the guide adapted to receive the heel only of a rider on the vehicle and the bracket being connected to the other end of the flexible device.

7. In an occupant propelled vehicle of the character described having a driving road wheel, ratchet means operated by the occupant for revolving said wheel including a ratchet hub, a revolvable member carrying a pawl adapted for engagement with the ratchet hub, and an inertia weight mounted for revolution with said member operative to throw the pawl into engagement with said ratchet upon revolving said member one way and to throw it out of engagement upon reverse revolution.

8. In an occupant propelled vehicle of the character described having a driving road wheel, an occupant operated device, power transmitting means connecting said device for driving the road wheel and including a rotatably mounted ratchet hub, a rotatably mounted pawl carrying member, a pawl mounted on the member adapted to engage the ratchet, and an inertia weight mounted for revolution by said member adapted to move the pawl into engagement with the ratchet upon operating said device.

9. In an occupant propelled vehicle of the character described having a driving road wheel, an occupant operated device, power transmitting means connecting said device for driving the road wheel and including a rotatably mounted ratchet hub, a rotatably mounted pawl carrying member, a pawl mounted on the member adapted to engage the ratchet, and an inertia weight mounted for revolution by said member adapted to move the pawl into engagement with the ratchet upon operating said device and to stabilize the pawl when it is disengaged.

10. In an occupant propelled vehicle of the character described having a driving road wheel, an occupant operated device, power transmitting means connecting said device for driving the road wheel and including a rotatably mounted pawl carrying spool, a flexible member secured at one end to the spool, an idler over which the member extends with the other end of the member secured to said device so as to revolve the spool upon one way operation of the device, a rewinding spring arranged for reversing the spool and thereby reversing the movement of said device, a pawl pivoted to the spool adapted to engage the ratchet, an inertia weight mounted for revolution by said spool adapted to move the pawl into engagement with the ratchet upon revolving the spool one way and to release it therefrom upon revolving the spool in the reverse way.

11. In an occupant propelled vehicle of the character described having a driving road wheel, occupant operated power transmitting means arranged for driving the road wheel and including a spring return ratchet drive comprising a revolvable spool, a plurality of connections spaced around said spool, a flexible power transmitting device extending to the spool and adapted to selectively engage any of said connections for varying the return spring tension.

12. In an occupant propelled vehicle of the character described having a driving road wheel, occupant operated power transmitting means arranged for driving the road wheel and including a spring return ratchet drive comprising a revolvable spool, a plurality of slots spaced around said spool, a flexible power transmitting device extending to the spool and adapted to engage any of said slots for varying the return spring tension.

13. In an occupant propelled vehicle of the character described having a driving road wheel, occupant operated power transmitting means arranged for driving the road wheel and including a spring return ratchet drive comprising a revolvable spool, a flexible power transmitting device extending to the spool and adapted to engage at selective positions therearound.

SAMUEL L. ROGERS.